(12) United States Patent
Charquet et al.

(10) Patent No.: US 7,627,075 B2
(45) Date of Patent: Dec. 1, 2009

(54) ZIRCONIUM-BASED ALLOY AND METHOD FOR MAKING A COMPONENT FOR NUCLEAR FUEL ASSEMBLY WITH SAME

(75) Inventors: Daniel Charquet, Albertville (FR); Jean-Paul Mardon, Caluire (FR); Jean Senevat, Annecy (FR)

(73) Assignee: Framatome ANP, Courbevoie (FR)

( * ) Notice: Subject to any disclaimer, the term of this patent is extended or adjusted under 35 U.S.C. 154(b) by 800 days.

(21) Appl. No.: 10/885,927

(22) Filed: Jul. 6, 2004

(65) Prior Publication Data

US 2005/0061408 A1 Mar. 24, 2005

Related U.S. Application Data

(63) Continuation-in-part of application No. 10/089,530, filed as application No. PCT/FR00/02666 on Sep. 27, 2000, now abandoned.

(30) Foreign Application Priority Data

Sep. 30, 1999 (FR) .................................. 99 12247

(51) Int. Cl.
*G21C 5/00* (2006.01)

(52) U.S. Cl. ...................... 376/457; 376/900; 148/421; 148/372; 420/422

(58) Field of Classification Search ................. 376/457, 376/900; 148/421, 672; 420/422
See application file for complete search history.

(56) References Cited

U.S. PATENT DOCUMENTS

| 4,584,030 | A | * | 4/1986 | McDonald et al. ........... 148/281 |
| 4,775,508 | A | * | 10/1988 | Sabol et al. .................. 376/416 |
| 5,244,514 | A | * | 9/1993 | Garde ......................... 148/421 |
| 5,832,050 | A | * | 11/1998 | Rebeyrolle et al. ........... 376/457 |
| 6,863,745 | B1 | * | 3/2005 | Charquet et al. ............. 148/421 |

FOREIGN PATENT DOCUMENTS

| EP | 0533 073 | * | 3/1993 |
| FR | 2 769 637 | | 4/1999 |
| WO | 93 16205 | | 8/1993 |
| WO | 97 05628 | | 2/1997 |
| WO | 99 50854 | | 10/1999 |

* cited by examiner

*Primary Examiner*—Rick Palabrica
(74) *Attorney, Agent, or Firm*—Davidson, Davidson & Kappel, LLC

(57) ABSTRACT

The invention proposes a zirconium-based alloy also containing, by weight, apart from unavoidable impurities, from 0.02 to 1% of iron, from 0.8% to 2.3% of niobium, less than 2000 ppm of tin, less than 2000 ppm of oxygen, less than 80 ppm of carbon, from 5 to 35 ppm of sulphur and less than 0.25% in total of chromium and/or vanadium, the ratio R of the niobium content less 0.5% to the iron content, optionally supplemented by the chromium and/or vanadium content, being lower than 3.

4 Claims, 4 Drawing Sheets

ZIRCONIUM-BASED ALLOY AND METHOD FOR MAKING A COMPONENT FOR NUCLEAR FUEL ASSEMBLY WITH SAME

RELATED APPLICATIONS

This application is a continuation-in-part of U.S. patent application Ser. No. 10/089,530 filed on Aug. 19, 2002 now abandoned which is based on PCT Application No. PCT/FR00/02666 filed on Sep. 27, 2000 which is based on French Patent Application No. 99 12247 filed on Sep. 30, 1999.

FIELD OF THE INVENTION

The present invention relates to zirconium-based alloys that are to constitute nuclear fuel assembly components usable in light-water nuclear reactors, such as nuclear fuel rod claddings or assembly guide tubes, or even flat products, such as grid plates.

The invention may be used, although not exclusively, in the field of the manufacture of cladding tubes for fuel rods intended for pressurized-water reactors in which the risks of corrosion are particularly high as a result of a high lithium content and possibly as a result of risk of boiling, and also in the field of strip materials used for structural components of the fuel assemblies of such reactors. The invention also proposes a method for making such components.

BACKGROUND INFORMATION

Patent application PCT FR99/00737 proposes a zirconium-based alloy also containing, by weight, apart from unavoidable impurities, from 0.03 to 0.25% in total of iron, on the one hand, and of at least one of the elements of the group constituted by chromium and vanadium, on the other hand, having from 0.8 to 1.3% of niobium, less than 2000 ppm of tin, from 500 to 2000 ppm of oxygen, less than 100 ppm of carbon, from 5 to 35 ppm of sulphur and less than 50 ppm of silicon, the ratio of the iron content, on the one hand, to the chromium or vanadium content, on the other hand, being from 0.5 to 30.

The invention is based on observations made by the inventors in the course of a systematic study of the intermetallic phases and the crystallographic forms of those phases which appear when the relative contents of iron and niobium are varied while the contents of tin, sulphur and oxygen are described in the application mentioned above. It is also based on the observation, made experimentally, that the nature and the crystallographic form of the intermetallic phases containing zirconium, iron and niobium have a major influence on corrosion resistance in various environments.

In particular, it has been found that the presence of compounds having a crystalline structure with a face-centered cubic lattice, obtained owing to a proportion of iron relative to niobium sufficient to result in the presence of $(Zr\ Nb)_4 Fe_2$, at the expense of the compound $Zr(Nb, Fe)_2$ having a hexagonal lattice, and of the phase $\beta Nb$, which predominate at the high Nb/Fe ratios, substantially improves corrosion in a medium having a high lithium content, such as that which exists at the beginning of an operating cycle of some pressurized-water reactors. On the other hand, the presence of the phase having a face-centered cubic lattice in too large a quantity slightly impairs corrosion resistance in an aqueous medium.

SUMMARY

The present invention aims especially to provide an alloy which enables components to be obtained wherein the composition may be adapted in an optimum manner to the conditions of use provided for and whose composition is not likely to hamper the manufacturing steps excessively.

To that end, the invention proposes, in particular, a zirconium-based alloy also containing, by weight, apart from unavoidable impurities, from 0.02 to 1% of iron, preferably 0.05 to 1%, more preferably 0.3% to 0.35%, from 0.8% to 2.3% of niobium, less than 2000 ppm of tin, less than 2000 ppm of oxygen, less than 80 ppm of carbon, from 5 to 35 ppm of sulphur and less than 0.25% in total of chromium and/or vanadium, the ratio R of the niobium content less 0.5% to the iron content, optionally supplemented by the chromium and/or vanadium content, being lower than 3.

The choice of the ratio $R=(Nb-0.5\%)/Fe+Cr+V$ results from the observation that the phase having a face-centered cubic lattice appears as soon as the relation between the content of Fe (and also of Cr and V if they are present) and the content of Nb is such that R is lower than a threshold which depends slightly on the contents of other elements and on the temperature but is at most 3.

The invention also proposes a method for making a tube according to which:

a bar is produced from a zirconium-based alloy also containing, by weight, apart from unavoidable impurities, from 0.02 to 1% of iron, from 0.8% to 2.3% of niobium, less than 2000 ppm of tin, less than 2000 ppm of oxygen, less than 100 ppm of carbon, from 5 to 35 ppm of sulphur and less than 0.25% in total of chromium and/or vanadium, the ratio of the niobium content less 0.5% to the iron content, optionally supplemented by the chromium and/or vanadium content, being lower than 3;

the bar is water-quenched after heating at from 1000° C. to 1200° C.;

a blank is extruded after heating at a temperature of from 600° C. to 800° C.;

the blank is cold-rolled in at least two passes to obtain a tube, with intermediate thermal treatments at from 560° C. to 620° C.; and a final thermal treatment is carried out at from 560° C. to 620° C., preferably 560° to 600° C., more preferably 560° C. to 580° C., all of the thermal treatments being carried out in an inert atmosphere or under vacuum.

The final thermal treatment leaves the tube in the recrystallized state, which promotes creep strength, without modifying the nature of the phases. The addition of chromium and/or vanadium, which is substituted for iron and niobium in the hexagonal phase, enables the proportion of the two phases, hexagonal and face-centered cubic, to be controlled.

The alloy may also be used to produce flat elements. Those elements are also used in the recrystallized state and may be manufactured by the following sequence: a blank is produced from a zirconium-based alloy also containing, by weight, in addition to unavoidable impurities, from 0.02 to 1% of iron, preferably 0.05 to 1%, more preferably 0.3% to 0.35%, from 0.8% to 2.3% of niobium, less than 2000 ppm of tin, less than 2000 ppm of oxygen, less than 80 ppm of carbon, from 5 to 35 ppm of sulphur and less than 0.25% in total of chromium and/or vanadium, the ratio R of the niobium content less 0.5% to the iron content, optionally supplemented by the chromium and/or vanadium content, being lower than 3, the blank is cold-rolled in at least three passes, with intermediate thermal treatments and a final thermal treatment, one of those intermediate thermal treatments or a preliminary thermal treatment before the first cold-rolling pass being effected for a long period of at least 2 hours at a temperature lower than 600° C., and any thermal treatment following the long treatment and, in particular, the final recrystallization treatment, being effected at a temperature lower than 620° C.

Preferably, the final recrystallization treatment is effected between 560° C. and 600° C., more preferably between 560° C. and 580° C.

The invention also proposes the application of the above alloy to the production of components of nuclear reactors operating with pressurized water that initially contains less than 5 ppm of lithium. Although that content then decreases rapidly, owing to its consumption in order to adjust the pH of the coolant, it may be important to avoid rapid initial corrosion.

The existence of the intermetallic compounds, which is due to the presence of iron in a sufficient quantity, including the existence of Zr (Nb, Fe)$_2$, reduces the amount of niobium precipitates in phase β which do not promote corrosion in a lithium-containing medium, but also the niobium content of the solid solution and therefore gives satisfactory resistance to uniform corrosion at a temperature of approximately 400° C., which is representative of the temperature that prevails in reactors.

An iron contenct of 0.02 to 1% is considered to be in accordance with the invention. But for iron contents of 0.05% and more within this range, a signicant increase of the reistance to corrosion in a lithium-containing medium at approximately 400° C. can be noticed. The value 0.05% corresponds to a volume fraction for βNb identical to the volume fraction for Zn(Nb,Fe)$_2$.

The presence of chromium and/or vanadium as a very partial replacement for iron in the intermetallic precipitates of the type Zr (Nb, Fe, Cr, V)$_2$ has no marked effect on corrosion at 400° C. because chromium and/or vanadium is simply substituted for iron and/or niobium in the intermetallic compound as the chromium content increases. The improved corrosion resistance at 400° C. is maintained especially if the sum Fe+Cr (optionally plus vanadium) is at least 0.03%.

The carbon content of the alloy must be kept at less than 80 ppm. It has been noticed that corrosion in a lithium-containing medium at approximately 400° C. dramatically increases after 50 days of exposure if the carbon content is over 100 ppm. A lessening of the carbon content to 100-80 ppm allows attenuation of this increase, but keeping the carbon content under 80 ppm allows this increase to happen only after 100 days or more.

To summarize, an alloy of the above type having a use in the recrystallised state to increase its resistance to the bi-axial creep of tubes and the aptitude for the pressing of sheet metal has characteristics which are adjustable by regulating the iron/niobium ratio but which are still favourable to:
- a high corrosion resistance in an aqueous medium at high temperature, which medium optionally contains lithium, the resistance being all the higher in this last-mentioned case if a high iron content is adopted, which is permitted by a high Nb content and with an iron/niobium ratio exceeding 0.3,
- a high creep strength owing to the presence of tin which remains at a very low content and, owing to doping with oxygen, at a content lower than 2000 ppm, which then has no harmful effect on corrosion resistance.

In current reactors, the ranges given below are particularly valuable as a zirconium-based alloy also containing, by weight, apart from unavoidable impurities:

Nb: 0.8% to 1.1% by weight
Fe: 0.3% to 0.35% by weight
Sn: 0.15% to 0.20% by weight
Cr and/or V: 0.01 to 0.1% by weight
O$_2$: 1000 to 1600 ppm
S: 5 to 35 ppm
C: less than 80 ppm

BRIEF DESCRIPTION OF THE DRAWINGS

The above characteristics and others will emerge more clearly on reading the following description of particular embodiments which are given by way of non-limiting example. The description refers to the drawings which accompany it and in which.

DETAILED DESCRIPTION

Figure 1:
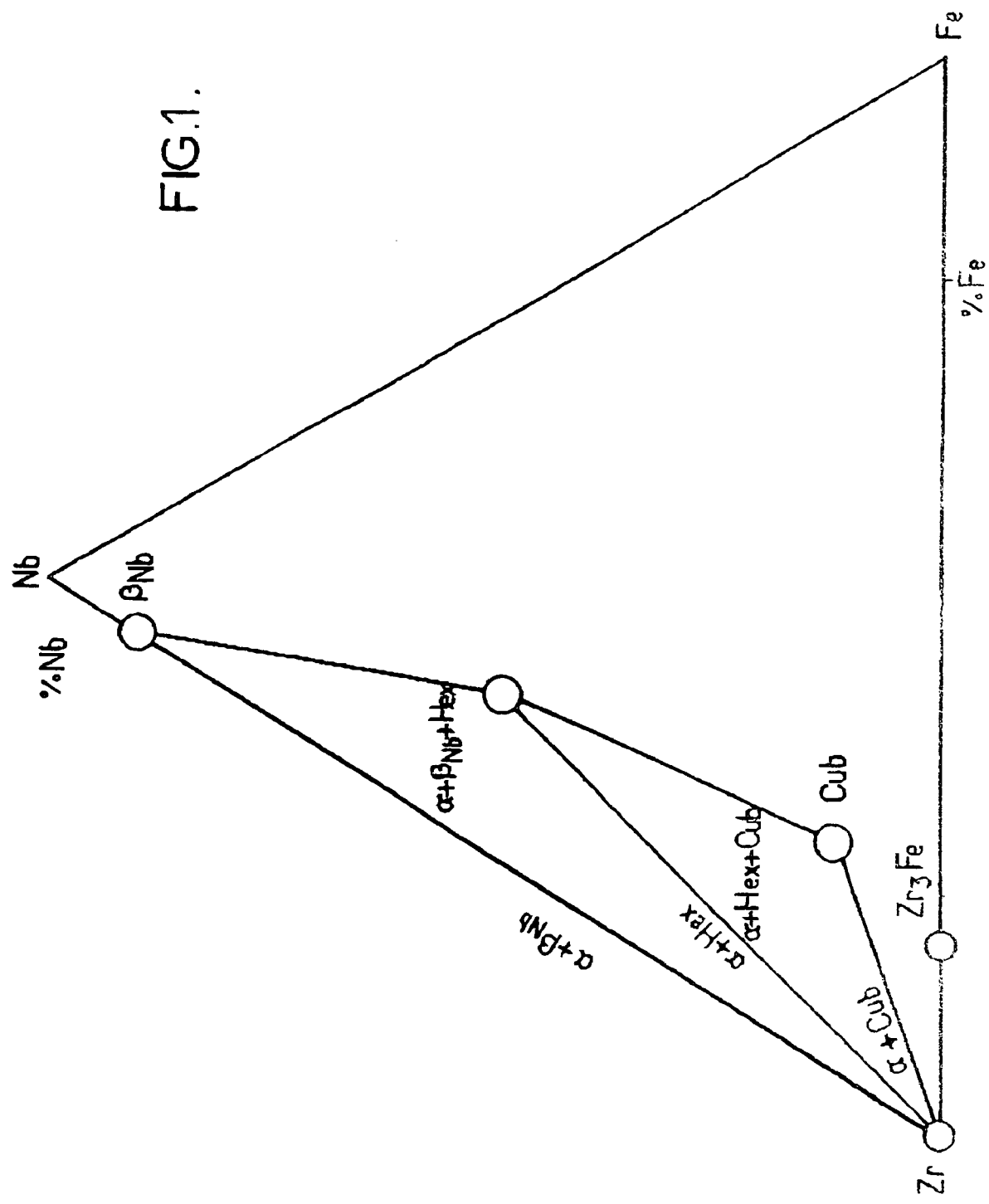
FIG. 1 is a ternary diagram showing the intermetallic compounds and microstructures which appear for various ranges of composition, in the case of a content of 0.2% of tin, at a temperature of from 560° C. to 620oc.
Figure 2:
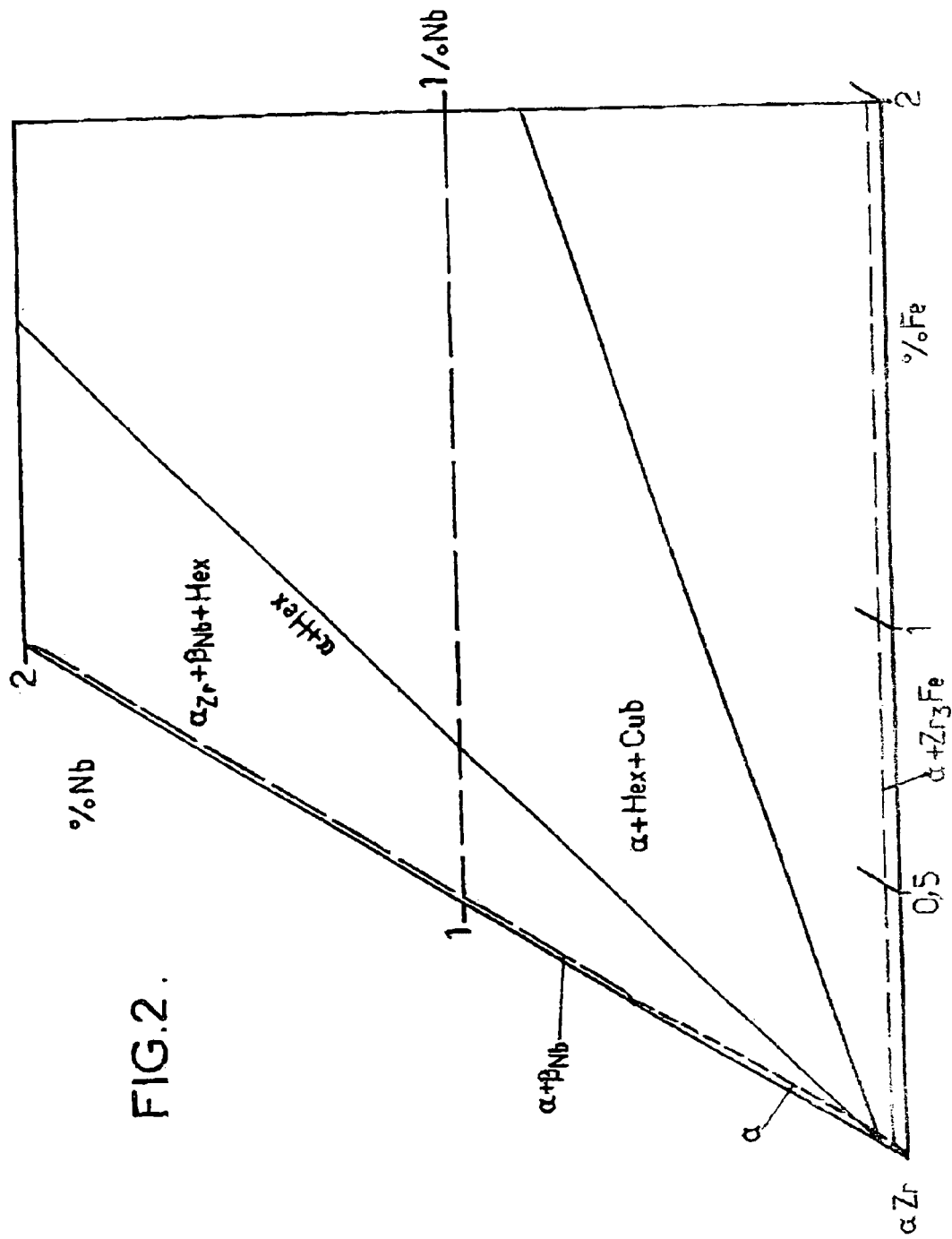
FIG. 2 illustrates a fraction of the diagram on a large scale.
Figure 3:
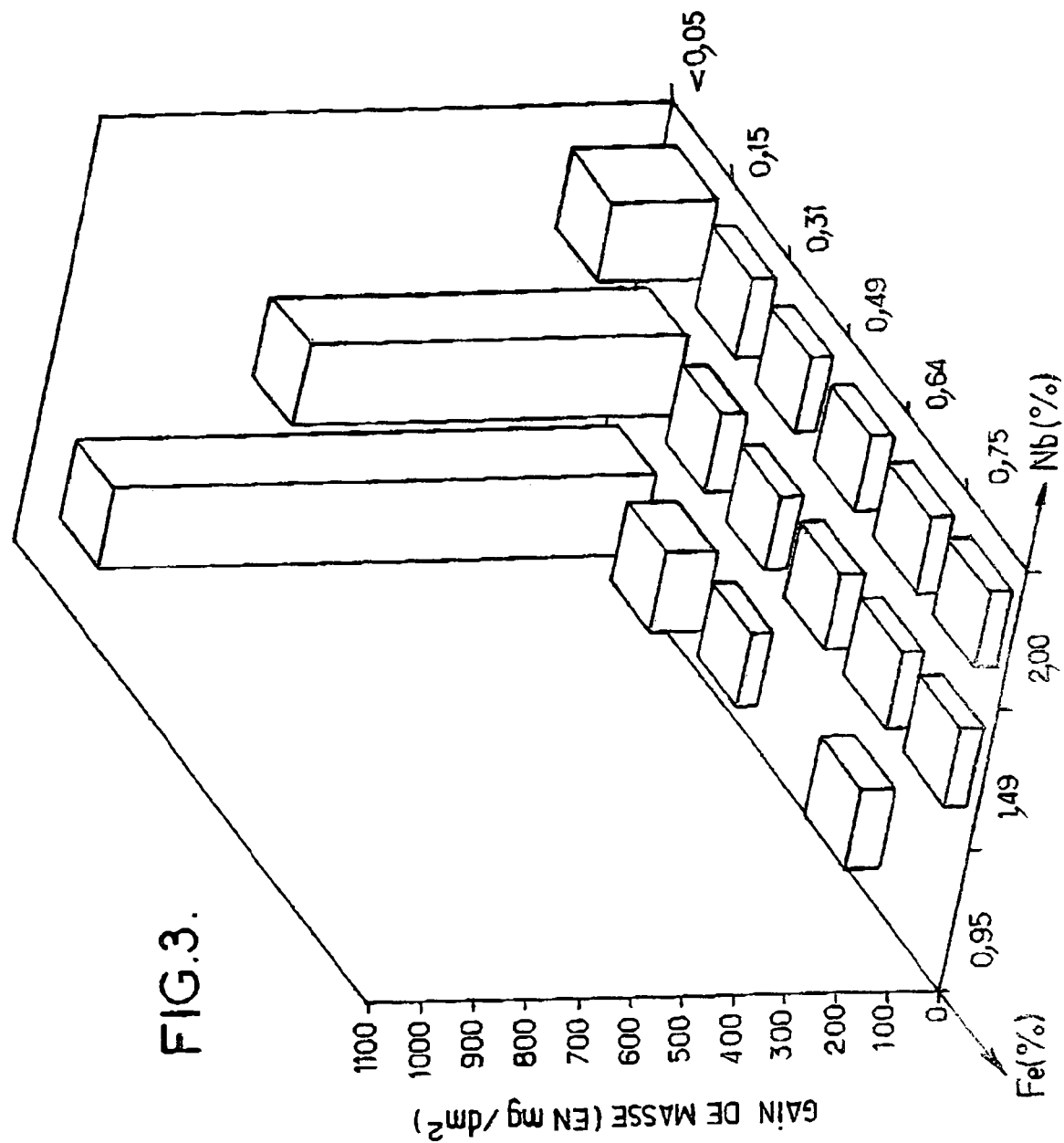
FIG. 3 illustrates results of corrosion tests in a lithium-containing medium on samples having variable iron and niobium contents.

Referring to the FIGS. 1 to 3, the carbon and oxygen contents of obtained samples are substantially identical for all of the samples and were lower than the maximum values given above. The tin content was 0.2% and the sulphur content was 10 ppm.

The samples were manufactured by thermo-metallurgical operations at a temperature not exceeding 620° C., any treatment exceeding that value beyond the extrusion operation reducing corrosion resistance at high temperature. The ternary diagram in FIG. 1 shows, for Fe/Nb ratios lower than approximately 0.3, the existence of a region in which the αZr phase (with the exclusion of the βZr phase which is very detrimental from the point of view of corrosion resistance), the βNb phase precipitates and the intermetallic phase Zr (Nb, Fe)$_2$, which has a hexagonal structure, co-exist.

For a high Fe/Nb ratio, up to a niobium content of the order of 50%, which is higher by more than one order of magnitude than the contents used, the compound (Zr, Nb)$_4$Fe$_2$, which is face-centered cubic, also appears. The βNb phase disappears completely only at a Fe/Nb ratio of the order of 0.6.

As will be seen hereinafter, it appeared that a high niobium content is very favorable to corrosion resistance in lithium-containing water.

The coexistence of the cubic and hexagonal phases is promoted by a Fe/Nb ratio higher than 0.3, while respecting the relation (Nb-0.5%)/Fe+Cr+V>2.5.

A precise study of the ternary diagram for the low Fe and Nb contents shows that the Nb content in solid solution develops with the Fe content, with Nb remaining constant.

As soon as the Fe content exceeds 60-70 ppm for the alloy according to the present invention, the hexagonal Zr (Nb,Fe)$_2$ form appears which substitutes the βNb phase for a ratio by weight of Nb/Fe substantially equal to 2.3.

There then appears the face-centered cubic compound (Zr, Nb)$_4$Fe$_2$, corresponding to Nb/Fe substantially equal to 0.6.

This face-centered cubic phase $(Zr, Nb)_4Fe_2$ starts to appear for:

1% Nb from 0.29 to 0.44% Fe
1.5% Nb from 0.49 to 0.66% Fe
2% Nb beyond 0.78% Fe

The diagram shows that, by simultaneously increasing the content of Nb and of Fe, a higher density of intermetallics is obtained, which promotes corrosion in a lithium-containing medium.

The influence of the Fe and Nb contents is shown more clearly in FIG. 3 which gives the measurement of the weight of alloy samples after maintenance for 84 days in water containing 70 ppm of lithium at a temperature of 360° C.; the measurement of the weight of a sample of Zircaloy 4 under the same conditions was 35.96 $mg/dm^2$.

The value of the simultaneous presence of a high content of niobium and iron and of the observance of the condition explained above will be immediately appreciated.

Figure 4:
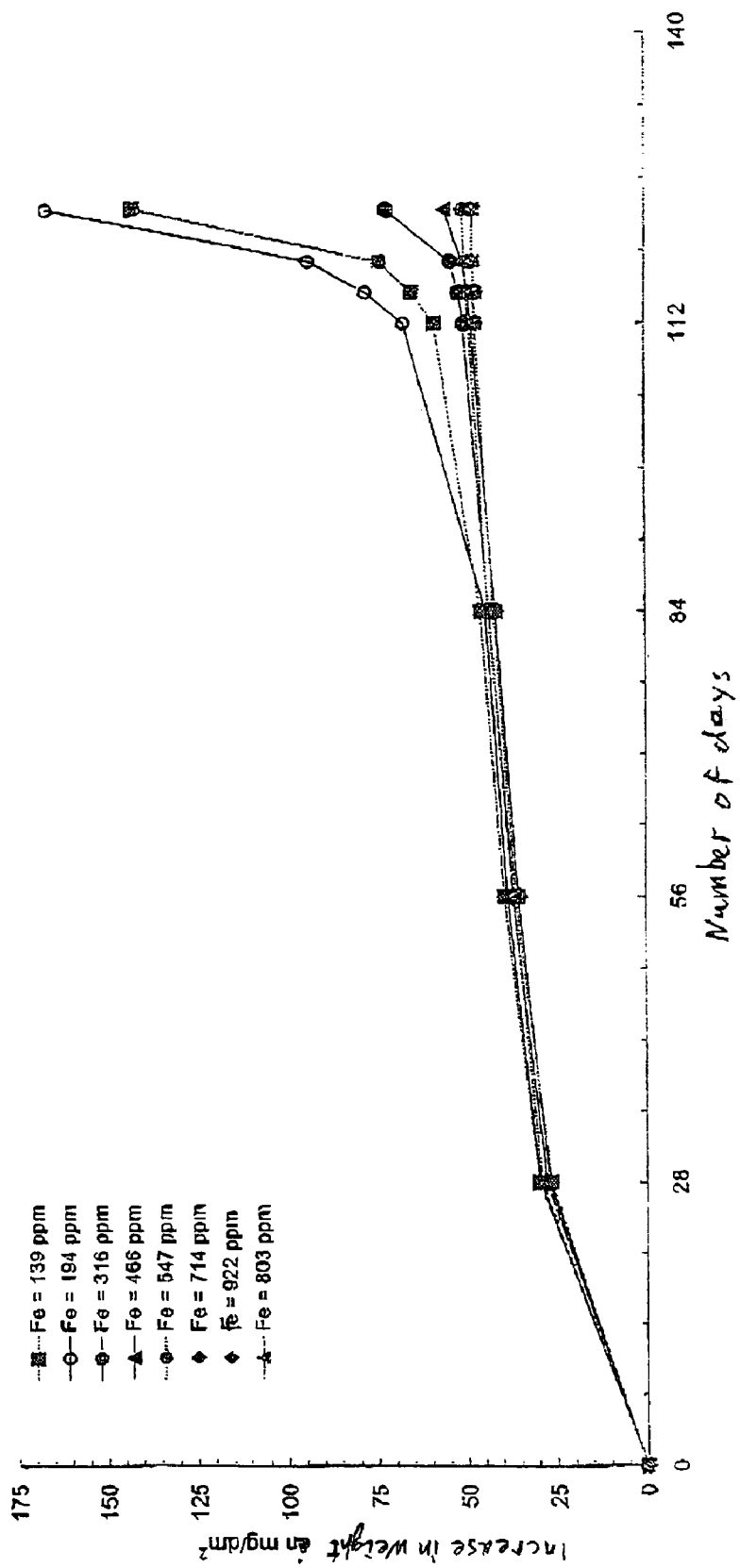
FIG. 4 illustrates the results of corrosion tests in a lithium-containing medium on samples having variable iron contents

The influence of iron alone on the weight of an alloy containing Nb=1%, 0=990 ppm, C=34 ppm, S=9 ppm is shown on FIG. 4, for iron contents between 0.0139 and 0.0922%.

It was also noticed that the temperature of the final recrystallization treatment has a significant influence on the corrosion behavior in a lithium-containing medium. As stated before, if the recrystallization is performed at more than 620° C., the resistance to corrosion at high temperatures is unacceptably low, But a significant downgrading of the corrosion resistance in a lithium-containing medium can be noticed already for recrystallization temperatures of 600° C. and more: an increase of the corrosion speed is observed after at most 50 days of exposure. For recrystallization temperatures of 560° C. to 580° C., such a downgrading occurs only after 100 days of exposure, or more.

What is claimed is:

1. A zirconium-based alloy consisting essentially of:
   zirconium; and
   in addition to unavoidable impurities, by weight, from 0.02 to 1% iron, from 0.8% to 2.3% niobium, less than 2000 ppm tin, less than 2000 ppm oxygen, less than 80 ppm carbon, from 5 to 35 ppm sulphur and less than 0.25% chromium, wherein a ratio maintains a formula of (Nb−0.5%)/(Fe+Cr)<3.

2. A zirconium-based alloy according to claim 1, wherein the iron is 0.05% to 1%.

3. The zirconium-based alloy according to claim 1, wherein the niobium is from 0.8% to 1.1% by weight, the iron from 0.3% to 0.35% by weight, the tin from 0.15% to 0.20% by weight, the chromium from 0.01% to 0.1% by weight, the oxygen from 1000 to 1600 ppm, and the carbon from 34 to 80 ppm.

4. The zirconium-based alloy according to claim 1, where the oxygen is from 1000 to 1600 ppm.

* * * * *